(12) United States Patent
Okura et al.

(10) Patent No.: US 10,703,416 B2
(45) Date of Patent: Jul. 7, 2020

(54) VEHICLE FRONT PORTION STRUCTURE

(71) Applicant: TOYOTA JIDOSHA KABUSHIKI KAISHA, Aichi-ken (JP)

(72) Inventors: Daiki Okura, Seto (JP); Yoshihito Tomizawa, Toyota (JP); Yoshinori Domon, Nagoya (JP); Akira Sabu, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 69 days.

(21) Appl. No.: 16/175,838

(22) Filed: Oct. 31, 2018

(65) Prior Publication Data

US 2019/0126983 A1 May 2, 2019

(30) Foreign Application Priority Data

Nov. 2, 2017 (JP) .................................. 2017-212452
Feb. 9, 2018 (JP) .................................. 2018-021774

(51) Int. Cl.
*B62D 21/15* (2006.01)
*B62D 25/08* (2006.01)
(Continued)

(52) U.S. Cl.
CPC .............. *B62D 21/152* (2013.01); *B60K 1/04* (2013.01); *B62D 21/11* (2013.01); *B62D 21/155* (2013.01);
(Continued)

(58) Field of Classification Search
CPC ... B60K 1/00; B60K 1/04; B60K 5/00; B60K 5/12; B60K 5/1216; B62D 21/11;
(Continued)

(56) References Cited

U.S. PATENT DOCUMENTS 8,517,453 B2 * 8/2013 Yoshida ............... B62D 21/152
280/274
9,027,695 B2 * 5/2015 Nakamura ........... B62D 21/155
180/247
(Continued)

FOREIGN PATENT DOCUMENTS

EP 1674316 A1 * 6/2006 ............. B62D 21/11
EP 1870317 A1 * 12/2007 ........... B62D 21/155
(Continued)

*Primary Examiner* — Jason S Daniels
(74) *Attorney, Agent, or Firm* — Hauptman Ham, LLP

(57) ABSTRACT

A vehicle front portion structure includes a pair of front side members arranged at a distance from each other in a vehicle width direction, each of the front side members extending in a vehicle front-rear direction, a gusset attached to a vehicle width direction outside surface of each of the front side members, protruding outwards in the vehicle width direction beyond the front side member, and having a vehicle width direction dimension decreasing toward a rear of a vehicle, and an MC cross member stretching between the front side members, in which the MC cross member and the front side member face each other in a state where the MC cross member and the front side member are apart from each other in the vehicle width direction at the same vehicle front-rear direction position as a rear end of the gusset.

13 Claims, 10 Drawing Sheets

(51) Int. Cl.
*B60K 1/04* (2019.01)
*B62D 21/11* (2006.01)
*B60R 19/34* (2006.01)

(52) U.S. Cl.
CPC ...... *B62D 25/08* (2013.01); *B60K 2001/0411* (2013.01); *B60R 19/34* (2013.01)

(58) Field of Classification Search
CPC .... B62D 21/152; B62D 21/155; B62D 25/08; B62D 25/082
USPC ............ 296/187.09, 187.1, 203.02
See application file for complete search history.

(56) References Cited

U.S. PATENT DOCUMENTS

| | | | |
|---|---|---|---|
| 9,061,713 B2 * | 6/2015 | Hashimoto | ............. B60R 19/02 |
| 2004/0195862 A1 * | 10/2004 | Saeki | .................. B62D 21/152 |
| | | | 296/187.09 |
| 2014/0361560 A1 * | 12/2014 | Sakakibara | ............. B60R 19/34 |
| | | | 293/133 |
| 2015/0246651 A1 * | 9/2015 | Muraji | ................. B62D 21/152 |
| | | | 296/187.1 |

FOREIGN PATENT DOCUMENTS

| | | |
|---|---|---|
| JP | 2004-314803 A | 11/2004 |
| JP | 2015-89750 A | 5/2015 |
| JP | 2017-30579 A | 2/2017 |
| JP | 2017-47780 A | 3/2017 |

* cited by examiner

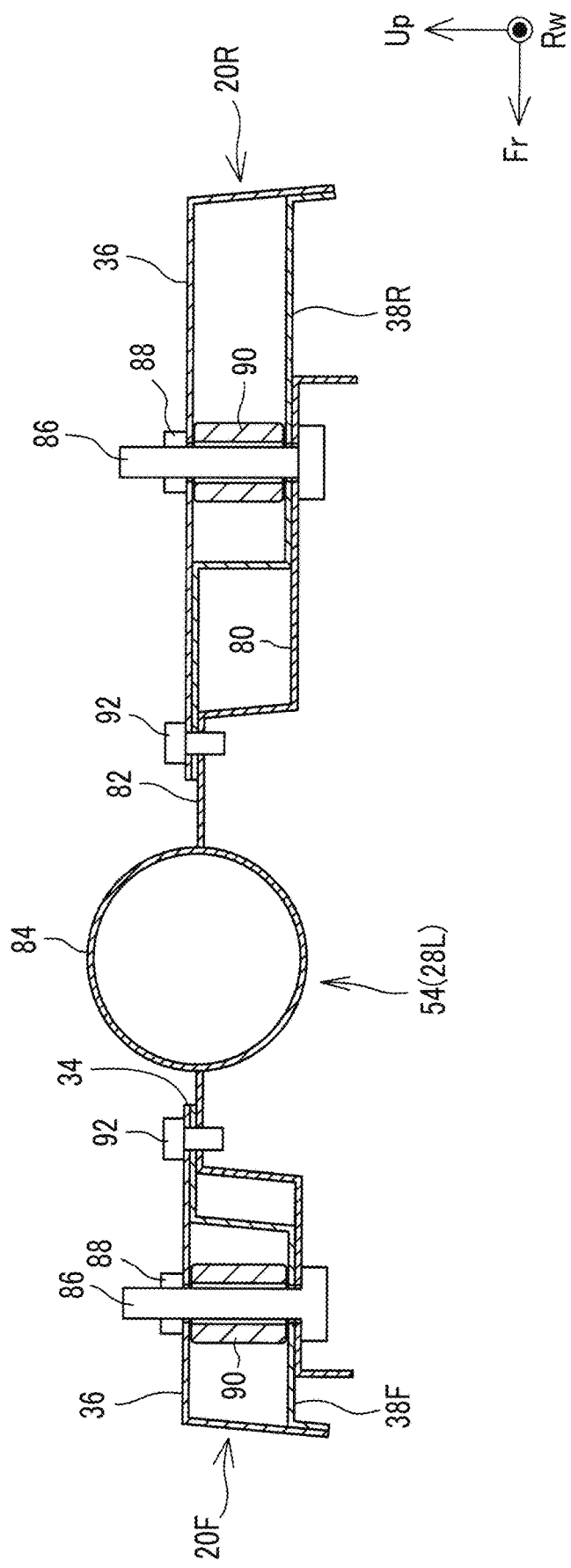

VEHICLE FRONT PORTION STRUCTURE

INCORPORATION BY REFERENCE

The disclosures of Japanese Patent Application No. 2017-212452 filed on Nov. 2, 2017 and Japanese Patent Application No. 2018-021774 filed on Feb. 9, 2018, including the specifications, drawings and abstracts are incorporated herein by reference in their entireties.

BACKGROUND

1. Technical Field

The present disclosure relates to a vehicle front portion structure.

2. Description of Related Art

In many cases, a power unit room is disposed in the front portion of a vehicle. A power unit generating traveling power, such as an engine and a motor unit, is arranged in the power unit room. Usually, a front side member as a type of vehicle skeleton member is arranged on both sides of the power unit in the width direction of the vehicle. The front side member is a skeleton member extending in the front-rear direction of the vehicle and is a member receiving a collision load during a frontal collision of the vehicle.

Frontal collisions include a small overlap collision in which a collision body collides with simply an end portion of a vehicle body front surface (such as a 25% outer side of the vehicle body front surface) and an oblique collision in which a high-speed collision body collides obliquely with a vehicle from the front thereof as well as a full overlap crash in which a vehicle body front surface collides with a collision body in the entire width thereof. During a small overlap collision or an oblique collision, the collision load that is input from a collision body may not be sufficiently received by the front side member.

Proposed in the related art in this regard is a gusset that protrudes outwards in a vehicle width direction being disposed on the outside surface of a front side member so that the collision load during a small overlap collision is transmitted to the front side member. Also proposed is transmission of a collision load transmitted via the gusset to the front side member on one side to the front side member on the opposite side via a power unit. By the collision load being transmitted to the front side member on the opposite side, a vehicle body as a whole is likely to escape in a direction to avoid the collision load, and then occupants and high-voltage parts can be protected in a more reliable manner.

For example, Japanese Unexamined Patent Application Publication No. 2017-030579 (JP 2017-030579 A) discloses a vehicle that has a front portion which is provided with a power unit (such as an engine and an electric motor), front side members arranged on both sides of the power unit in the width direction of the vehicle, and a load-receiving member (such as a gusset) disposed on the outside of the front side member in the vehicle width direction. In the above-described vehicle, the collision load during a small overlap collision is transmitted to the power unit via the load-receiving member and the front side member on one side. As a result, the collision load can be more efficiently absorbed.

SUMMARY

Vehicles include engineless cars such as electric vehicles and fuel cell vehicles. In engineless cars, a rotary electric machine unit is arranged as a power unit. The rotary electric machine unit may be arranged below a front side member. In this case, the front side member does not abut against the rotary electric machine unit even after being bent inwards in a vehicle width direction, and thus no collision load can be transmitted to the front side member on the opposite side via the rotary electric machine unit. In addition, the rotary electric machine unit is a high-voltage part in the first place, and thus collision load transmission to the front side member on the opposite side via the rotary electric machine unit is undesirable.

The present disclosure provides a vehicle front portion structure with which the collision load during a small overlap collision or an oblique collision can be transmitted to a front side member on an opposite side not via a power unit.

A first aspect of the present disclosure relates to a vehicle front portion structure including a pair of front side members, a gusset, and an MC cross member. The front side members are arranged at a distance from each other in a vehicle width direction. Each of the front side members extends in a vehicle front-rear direction. The gusset is attached to a vehicle width direction outside surface of each of the front side members, protrudes outwards in the vehicle width direction beyond the front side member, and has a vehicle width direction dimension decreasing toward a rear of a vehicle. The MC cross member stretches between the front side members. The MC cross member and the front side member face each other in a state where the MC cross member and the front side member are apart from each other in the vehicle width direction at the same vehicle front-rear direction position as a rear end of the gusset.

Here, of the front side members, the same vehicle front-rear direction position as the rear end of the gusset is a place prone to stress concentration and bending of the front side member during a small overlap collision or an oblique collision. The front side member can be reliably bent by the MC cross member and the front side member facing each other in a state where the MC cross member and the front side member are apart from each other in the vehicle width direction at the position prone to bending of the front side member as described above. By the front side member being bent, a collision load can be transmitted to the front side member on the opposite side from the front side member via the MC cross member. In other words, the collision load during a small overlap collision or an oblique collision can be transmitted to the front side member on the opposite side not via a power unit.

In the vehicle front portion structure according to the first aspect of the present disclosure, a projecting wall may be disposed on a vehicle width direction outside surface of the MC cross member at the same vehicle front-rear direction position as the rear end of the gusset or a vehicle front-rear direction position behind the rear end of the gusset. The projecting wall may project outwards in the vehicle width direction beyond vehicle width direction outside surface of the MC cross member at a front side of the projecting wall.

In the configuration as described above, a rearward movement of the bent front side member is regulated by the projecting wall. As a result, a collision load is unlikely to escape to the rear of the vehicle, and thus a collision load can be transmitted from the front side member to the MC cross member in a more reliable manner.

In the vehicle front portion structure according to the first aspect of the present disclosure, a reinforcing rib extending in the vehicle front-rear direction and interrupted in a middle may be disposed in a vehicle width direction end surface of the front side member. The projecting wall may be disposed at the same vehicle front-rear direction position as the interrupted place of the reinforcing rib or a vehicle front-rear direction position behind the interrupted place of the reinforcing rib.

The interrupted place of the reinforcing rib also is a place prone to stress concentration and bending of the front side member during a small overlap collision or an oblique collision. By the projecting wall being disposed at the vehicle front-rear direction position that is the same as or behind the position prone to bending of the front side member as described above, a rearward movement of the front side member can be suppressed in a more reliable manner and a collision load can be transmitted from the front side member to the MC cross member in a more reliable manner.

In the vehicle front portion structure according to the first aspect of the present disclosure, the MC cross member may include an upper member forming an upper surface of the MC cross member and lower members forming a bottom surface of the MC cross member. The upper member and the lower members may form closed sections by being connected to each other.

By the MC cross member being configured to have a closed section, the rigidity of the MC cross member can be improved and a collision load input from the front side member on one side can be transmitted to the front side member on the opposite side in a more reliable manner.

The vehicle front portion structure according to the first aspect of the present disclosure may further include a bracket connecting the MC cross member and the front side member to each other in a state where the MC cross member and the front side member are apart from each other in the vehicle width direction.

By the bracket being used as described above, a space in which the front side member can be bent can be easily ensured between the MC cross member and the front side member.

In the vehicle front portion structure according to the first aspect of the present disclosure, the bracket, the upper member, and the lower members may be tightened together by first fastening bolts and nuts and the first fastening bolts may penetrate the closed sections the upper member and the lower members constitute.

By the first fastening bolt penetrating the closed section, the attachment rigidity of the first fastening bolt and the torsional rigidity of the MC cross member are improved.

In the vehicle front portion structure according to the first aspect of the present disclosure, the bracket may be fastened to the MC cross member and the front side member at the same vehicle front-rear direction position behind the rear end of the gusset. The bracket may have a plurality of first fastening holes used for fastening with the MC cross member and arranged side by side in the vehicle front-rear direction. Load-bearing portions as predetermined gaps may be interposed between a vehicle width direction inside end portion of the bracket and the first fastening holes, respectively. The load-bearing portions having a foremost position may be higher in strength than the other load-bearing portions.

By the above-described configuration being adopted, the bracket is capable of rotating with ease to follow bending of the front side member.

In the vehicle front portion structure according to the first aspect of the present disclosure, a vehicle width direction end portion of the MC cross member may be greater in height direction dimension than a vehicle width direction middle of the MC cross member.

By the above-described configuration being adopted, a vehicle width direction end surface of the MC cross member is likely to have a large area, and thus the front side member and the MC cross member come into contact with each other in a more reliable manner during bending of the front side member.

In the vehicle front portion structure according to the first aspect of the present disclosure, the MC cross member may include a front side cross portion extending in the vehicle width direction, a rear side cross portion disposed behind the front side cross portion and extending in the vehicle width direction, and a pair of side portions connecting end portions of the front side cross portion and the rear side cross portion to each other.

As a result of the presence of the side portion, a sufficient facing area can be ensured for the front side member and the MC cross member and load transmission from the front side member to the MC cross member or from the MC cross member to the front side member is performed in a more reliable manner.

In the vehicle front portion structure according to the first aspect of the present disclosure, the MC cross member may include a front side cross portion extending in the vehicle width direction and a rear side cross portion disposed behind the front side cross portion and extending in the vehicle width direction. The vehicle front portion structure may further include motor mounts connecting a high-voltage part to the MC cross member and stretching between the front side cross portion and the rear side cross portion.

By the motor mount stretching between the front side cross portion and the rear side cross portion, deformation of the front side cross portion toward the rear of the vehicle can be effectively suppressed even when a collision load directed rearwards from the front is received.

In the vehicle front portion structure according to the first aspect of the present disclosure, the motor mounts, the upper member, and the lower members may be tightened together by a stud bolt and a nut. The stud bolt may penetrate the closed sections the upper member and the lower members constitute.

By the stud bolt penetrating the closed section, the attachment rigidity of the stud bolt and the torsional rigidity of the MC cross member are improved.

In the vehicle front portion structure according to the first aspect of the present disclosure, the motor mounts may include a base portion fastened to bottom surfaces or upper surfaces of the front side cross portion and the rear side cross portion and a protruding portion protruding in a vehicle height direction from a middle of the base portion. The protruding portion may be positioned in a gap between the front side cross portion and the rear side cross portion when the base portion is fastened to the front side cross portion and the rear side cross portion.

By the above-described configuration being adopted, the front side cross portion abuts against the protruding portion in the event of deformation toward the rear of the vehicle, and thus deformation of the front side cross portion, deformation of the MC cross member eventually, is effectively restrained.

A second aspect of the present disclosure relates to a vehicle front portion structure including a pair of front side members and an MC cross member. The front side members are arranged at a distance from each other in a vehicle width direction. Each of the front side members extends in a vehicle front-rear direction. The MC cross member stretches between the front side members. The front side member has a stress concentration portion where stress concentration occurs during a small overlap collision or an oblique collision. The MC cross member and the front side member face each other in a state where the MC cross member and the front side member are apart from each other in the vehicle width direction at the same vehicle front-rear direction position as the stress concentration portion.

The stress concentration portion is a place prone to bending of the front side member during a small overlap collision or an oblique collision. The front side member can be reliably bent by the MC cross member and the front side member facing each other in a state where the MC cross member and the front side member are apart from each other in the vehicle width direction at the position prone to bending of the front side member as described above. By the front side member being bent, a collision load can be transmitted to the front side member on the opposite side from the front side member via the MC cross member. In other words, the collision load during a small overlap collision or an oblique collision can be transmitted to the front side member on the opposite side not via a power unit.

According to the aspects of the present disclosure, the collision load during a small overlap collision or an oblique collision can be transmitted to the front side member on the opposite side not via a power unit.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 12 is a schematic sectional view illustrating how a member side fastening portion of a left side motor mount is fastened to the MC cross member.

DETAILED DESCRIPTION OF EMBODIMENTS

Figure 1:
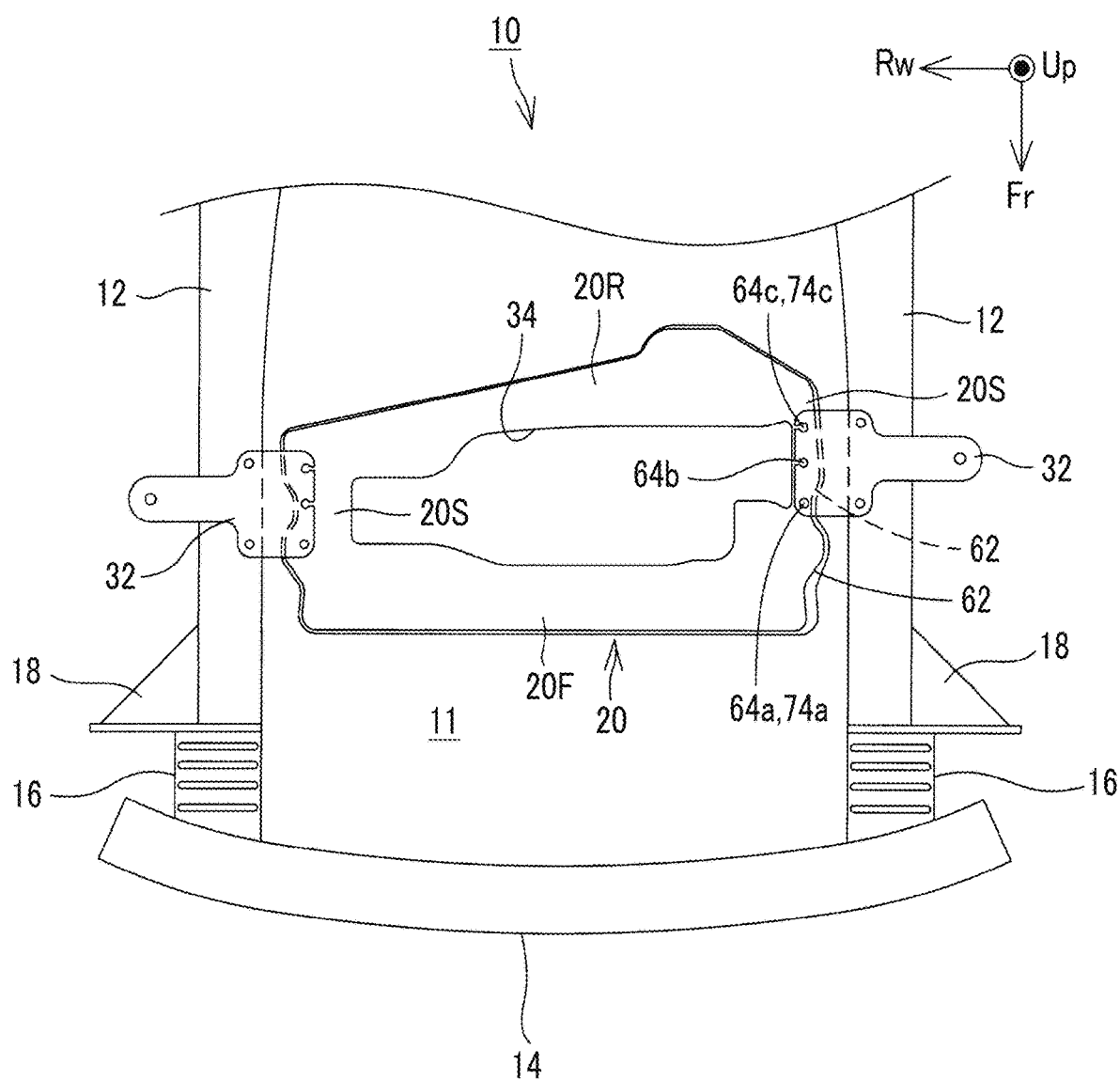
FIG. 1 is a schematic diagram illustrating a vehicle front portion structure.
Figure 2:
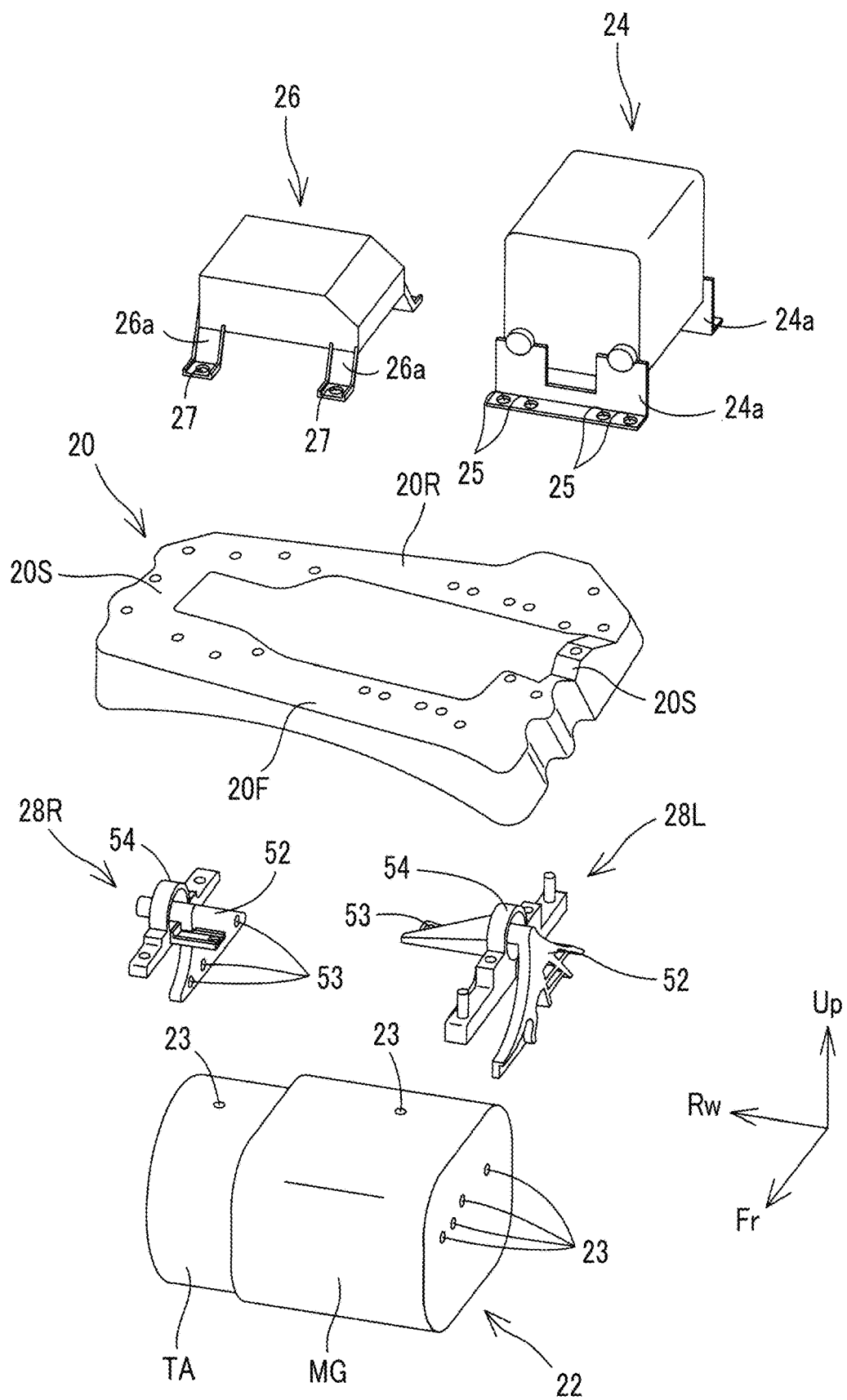
FIG. 2 is an exploded perspective view of an MC cross member and the vicinity thereof.

Hereinafter, a vehicle front portion structure 10 will be described with reference to accompanying drawings. FIG. 1 is a schematic plan view of the vehicle front portion structure 10. FIG. 2 is an exploded perspective view of a motor compartment cross member (hereinafter, referred to as an "MC cross member 20") and the vicinity thereof. In the drawings, the axis that is indicated by a symbol Fr represents the front-rear direction of a vehicle, the axis that is indicated by a symbol Rw represents the width direction of the vehicle, and the axis that is indicated by a symbol Up represents the height direction of the vehicle. Unless otherwise noted, the right and left in the following description means the right and left from the point of view of an occupant of the vehicle.

An overall configuration of the vehicle front portion structure 10 will be briefly described first. The vehicle front portion structure 10 is incorporated into an electrically-driven vehicle (such as an electric vehicle and a fuel cell vehicle) traveling by means of power generated by a rotary electric machine MG. A power unit room 11 (hereinafter, also referred to as a "motor compartment") in which a power unit is installed is disposed in the front portion of the vehicle. The power unit generates the traveling power of the vehicle. In the present embodiment, a rotary electric machine unit 22 (described later) functions as the power unit.

A bumper reinforcement (hereinafter, abbreviated as a "bumper RF") 14 extending in the vehicle width direction is disposed at the front end of the power unit room 11. The bumper RF 14 is curved in plan view to be convex toward the front of the vehicle. Front side members 12 are connected via crash boxes 16 to the vicinities of both ends of the bumper RF 14 in the vehicle width direction. The crash box 16 absorbs the collision energy during a vehicle collision by being compressively deformed in the vehicle front-rear direction. Accordingly, the crash box 16 normally has a form facilitating the compressive deformation in the vehicle front-rear direction such as a form in which a plurality of recessed beads is formed in the outer peripheral surface thereof.

The front side member 12 is connected to the rear of the crash box 16. The front side member 12 is a skeleton member extending in the vehicle front-rear direction. As illustrated in FIG. 1, the two front side members 12 are arranged substantially in parallel to each other and at a sufficient distance from each other in the vehicle width direction. A stress concentration portion is set in the front side member 12, and stress concentration occurs in the stress concentration portion when a load is received by the side surface of the front side member 12 as described later.

A gusset 18 is attached to the vehicle width direction outside surface of each front side member 12. The gusset 18 is a member that has a substantially triangular shape in plan view, and the dimension of the gusset 18 in the vehicle width direction decreases toward the rear of the vehicle. The front end of the gusset 18 is almost the same as the front end of the front side member 12. The gusset 18 projects outwards in the vehicle width direction beyond the front side member 12 and receives a load input from the outside of the front side member 12 in the vehicle width direction.

The MC cross member 20 is disposed between the front side members 12. The MC cross member 20 is connected to the front side member 12 via a bracket 32. In other words, the MC cross member 20 stretches between the front side members 12. Still, the MC cross member 20 is not in contact with the front side member 12 and the front side member 12 and the MC cross member 20 face each other in a state where the front side member 12 and the MC cross member 20 are apart from each other in the vehicle width direction. In other words, there is a slight gap between the MC cross member 20 and the front side member 12. The slight gap is to allow bending of the front side member 12, which will be described later.

As illustrated in FIG. 2, a charger 26 and a PCU 24 are placed on and fastened to the upper surface of the MC cross member 20. The rotary electric machine unit 22 is suspended from and held below the MC cross member 20 via a left side motor mount 28L and a right side motor mount 28R (hereinafter, referred to as a "motor mount 28" with the letters L and R omitted in a case where the right and left are not distinguished from each other). The rotary electric machine unit 22 is provided with a transmission (transaxle) TA and the rotary electric machine MG as a vehicle drive source. In the example that is illustrated in FIG. 2, the disposition of the rotary electric machine unit 22 is so-called horizontal placement and the rotary electric machine unit 22 is disposed in the power unit room 11 such that the longitudinal direction of the rotary electric machine unit 22 faces the vehicle width direction. A plurality of fastening openings 23 is formed in the upper surface of the rotary electric machine unit 22 and both end surfaces of the rotary electric machine unit 22 in the width direction. The motor mount 28 is fastened to the rotary electric machine unit 22 by the fastening opening 23 and a fastening opening 29 in the motor mount 28 being aligned and bolted.

The motor mount 28 is provided with an MG side fastening portion 52 fastened to the rotary electric machine unit 22 and a member side fastening portion 54 fastened to the MC cross member 20. Fastening of the motor mount 28, the rotary electric machine unit 22, and the MC cross member 20 will be described in detail later.

The PCU 24 is an electric power converter disposed on an electrical path connecting the rotary electric machine MG and a battery (not illustrated) to each other. The PCU 24 is provided with an electric power conversion circuit such as a DC/DC converter and an inverter. A plurality of fastening holes 25 is formed in a leg portion 24a extending below the PCU 24. The PCU 24 is fastened to the upper surface of the MC cross member 20 via fastening bolts (not illustrated) inserted into the fastening holes 25. A water heater may be attached to the MC cross member 20.

The charger 26 is connected to the battery (not illustrated) and provided with, for example, a boost circuit for electric power conversion and a transformer circuit for blocking a direct current component. A plurality of fastening holes 27 is formed in a leg portion 26a extending below the charger 26. The charger 26 is fastened to the upper surface of the MC cross member 20 via fastening bolts (not illustrated) inserted into the fastening holes 27.

A high-voltage cable (not illustrated) for sending and receiving electric power is arranged between the rotary electric machine unit 22, the PCU 24, the charger 26, and the battery (not illustrated). Apart of the high-voltage cable passes through an opening portion 34 formed in the middle of the MC cross member 20.

A case where a vehicle that has the vehicle front portion structure 10 undergoes a frontal collision will be briefly described below. Frontal collisions include, for example, a full overlap crash in which a vehicle body front surface collides with a collision body in the entire width thereof, a small overlap collision in which a collision body collides with simply an end portion of a vehicle body front surface (such as a 25% outer side of the vehicle body front surface), and an oblique collision in which a high-speed collision body collides obliquely with a vehicle from the front thereof.

The collision load during a full overlap crash is input to the right and left crash boxes 16 via the bumper RF 14. The crash box 16 is compressively deformed by receiving the collision load, and then the collision load is partially absorbed. The load that is not absorbed by the crash box 16 is transmitted to the pair of right and left front side members 12. The front side member 12 absorbs and disperses the load while, for example, being bent and deformed if necessary. During the absorption and dispersion, the bumper RF 14 moving rearwards or another member interposed between the bumper RF 14 and the MC cross member 20 reaches the front end of the MC cross member 20, and then the load directed toward the rear of the vehicle may be applied also to the MC cross member 20. In the present embodiment, the motor mount 28 crossing the opening portion 34 in the vehicle front-rear direction is attached to the MC cross member 20 so that deformation of the MC cross member 20 attributable to the rearward load is restrained. This also will be described later.

Figure 3:
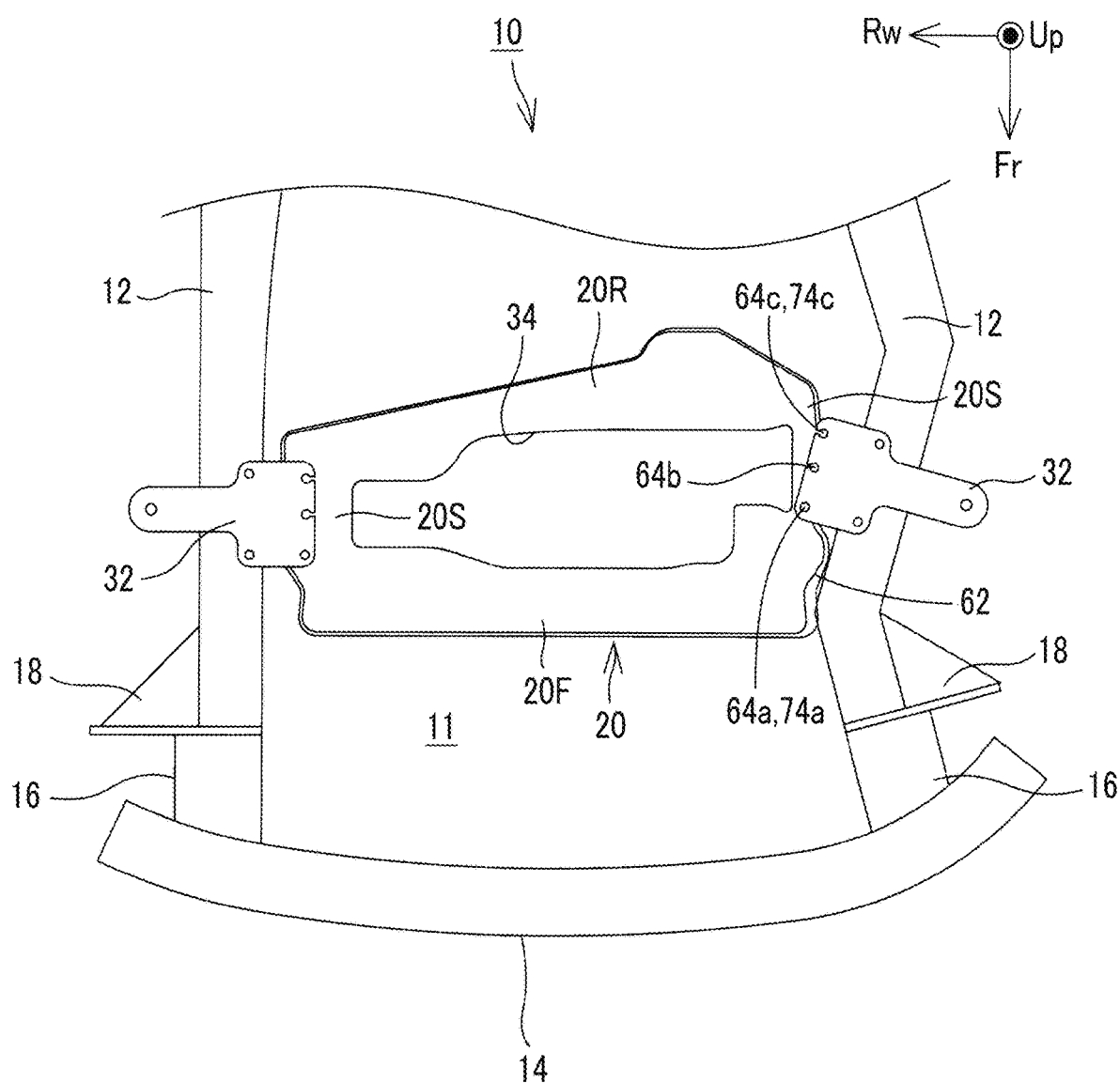
FIG. 3 is a diagram illustrating the state of a small overlap collision or an oblique collision.

The case of a small overlap collision or an oblique collision will be described with reference to FIG. 3. In this case, a collision body collides with the vehicle on the outside of the front side member 12 in the vehicle width direction. Accordingly, the collision load in this case is applied to the gusset 18 via the bumper RF 14 or directly and not via the bumper RF 14. The collision load applied to the gusset 18 is transmitted to the outside surface of the front side member 12 via the gusset 18. Then, the front side member 12 receives the collision load, is bent inwards in the vicinity of the rear end of the gusset 18, and is pushed inwards in the vehicle width direction as illustrated in FIG. 3. As a result, the front side member 12 abuts against the side surface of the MC cross member 20 and the collision load is transmitted to the MC cross member 20. The MC cross member 20 receives the collision load, moves in the vehicle width direction, and abuts against the front side member 12 on the opposite side (vehicle right side in the illustrated example).

In other words, the collision load during a small overlap collision or an oblique collision is sequentially transmitted to the gusset 18 on one side, the front side member 12 on one side, the MC cross member 20, and the front side member 12 on the opposite side. The collision load is absorbed and dispersed during the transmission. By the collision load being transmitted finally to the front side member 12 on the opposite side, the entire vehicle body becomes easy to move in a direction to escape from the collision load, and then deformation of and damage to each vehicle part attributable to the collision load can be reduced.

As is apparent from the above description, non-deformation of the MC cross member 20 is needed in a full overlap crash and an efficient collision load transmission from the front side member 12 to the MC cross member 20 is needed in a small overlap collision or an oblique collision. In the present embodiment, the configuration of each part is a configuration to satisfy the above-described demand. The configuration of each part will be described in more detail below.

Figure 4:
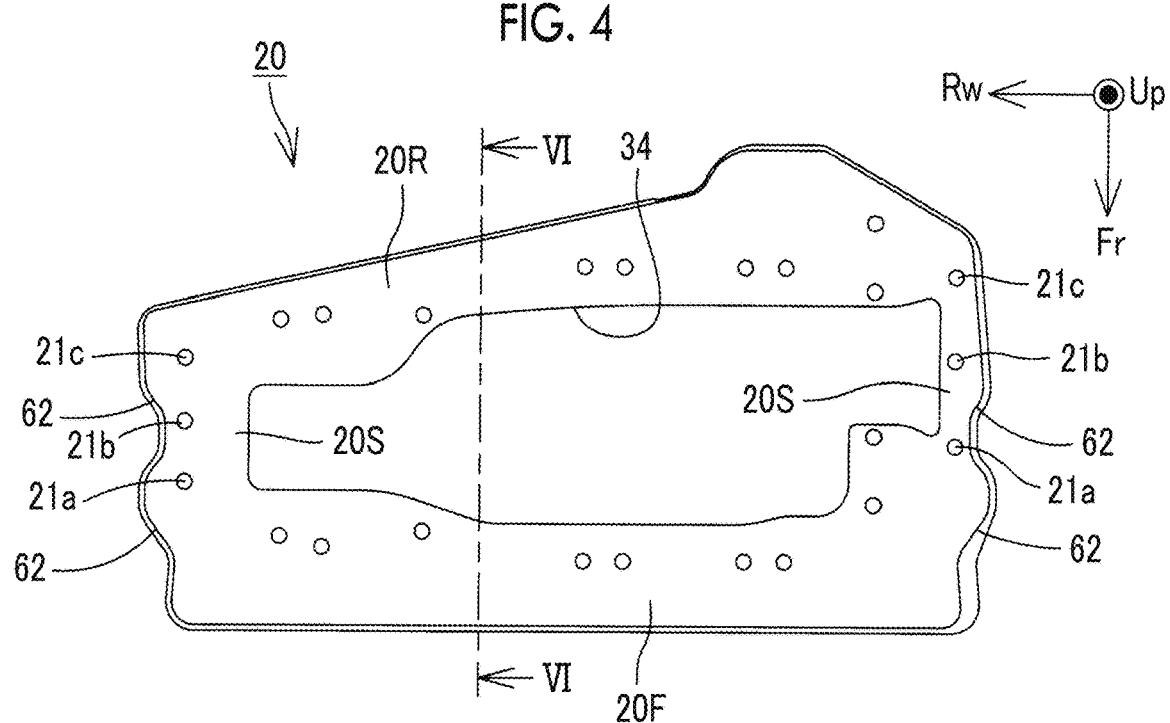
FIG. 4 is a plan view of the MC cross member.
Figure 5:
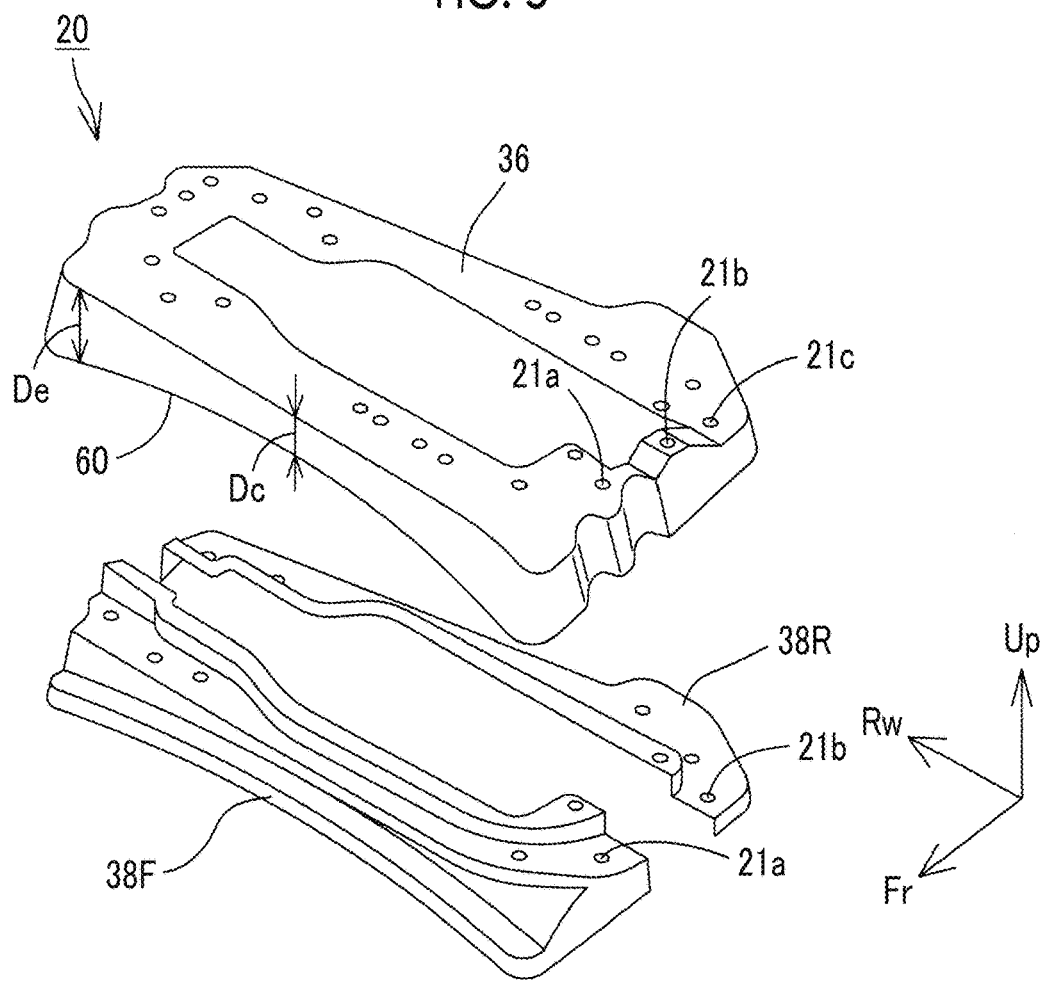
FIG. 5 is an exploded perspective view of the MC cross member.
Figure 6:
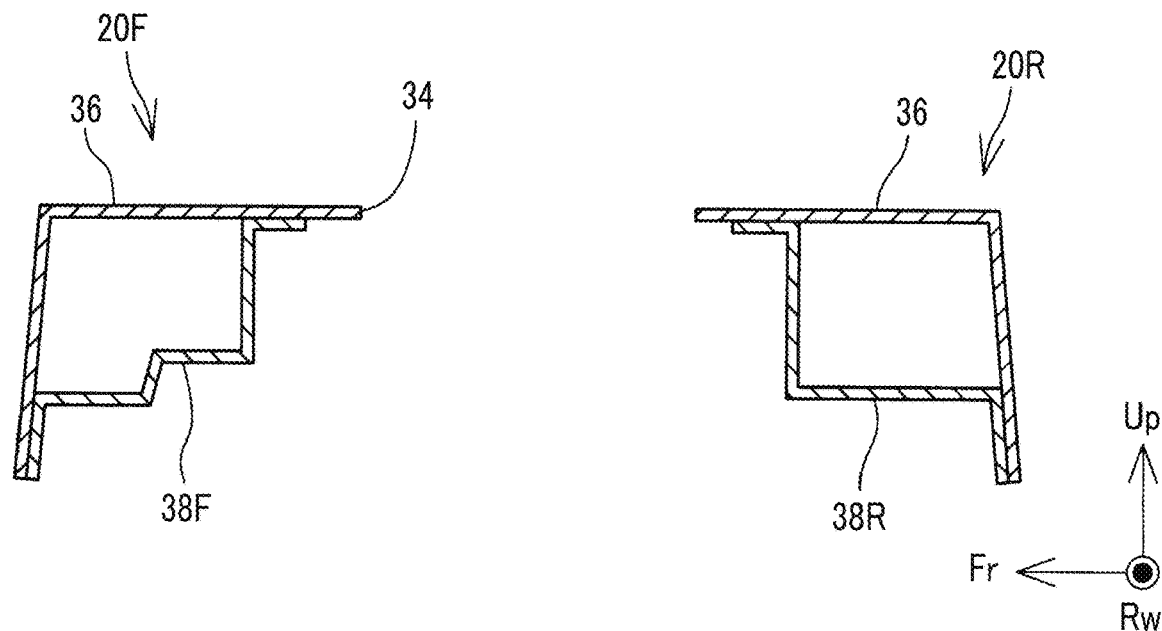
FIG. 6 is an end view taken along line VI-VI of FIG. 4.

The configuration of the MC cross member 20 will be described first with reference to FIGS. 4 to 6. FIG. 4 is a plan view of the MC cross member 20. FIG. 5 is an exploded perspective view of the MC cross member 20. FIG. 6 is an end view taken along line VI-VI of FIG. 4.

As described above, the MC cross member 20 is a member stretching between the front side members 12, the PCU 24 and the charger 26 are placed on the MC cross member 20, and the MC cross member 20 is a member holding the rotary electric machine unit 22 suspended from the MC cross member 20. As illustrated in FIG. 4, the MC cross member 20 has a substantially rectangular shape elongated in the vehicle width direction in plan view. The opening portion 34 elongated in the vehicle width direction is formed in the middle of the MC cross member 20, and the MC cross member 20 as a whole has a substantially quadrangular shape. A part of the high-voltage cable connected to the rotary electric machine unit 22, the PCU 24, and the charger 26 is arranged in the opening portion 34.

As illustrated in FIG. 5, the MC cross member 20 is configured as a combination of one upper member 36 and two lower members 38F, 38R. The upper member 36 is provided with an upper surface in which a large middle opening is formed and a peripheral surface hanging down from the peripheral edge of the upper surface and has a fully open bottom surface. The front side lower member 38F and the rear side lower member 38R are members attached to the lower side of the upper member 36 and have several steps formed in the vehicle front-rear direction. In the following description, the front side lower member 38F and the rear side lower member 38R will be referred to simply as a "lower member 38" with the letters F and R omitted in a case where the front and rear sides are not distinguished from each other.

As illustrated in FIG. 6, the front side lower member 38F and the rear side lower member 38R form closed sections with the upper member 36. In other words, the uppermost surface and the front end surface of the front side lower member 38F are in proximity to or contact with the upper member 36 whereas the other places of the front side lower member 38F are sufficiently apart from the upper member 36. Likewise, the uppermost surface and the rear end surface of the rear side lower member 38R are in proximity to or contact with the upper member 36 whereas the other places of the rear side lower member 38R are sufficiently apart from the upper member 36.

By the upper member 36 and the lower member 38 constituting the hollow shape of the MC cross member 20 as described above, the strength of the MC cross member 20 can be significantly improved compared to a case where one sheet of plate material constitutes an MC cross member. Especially, compressive deformation of the MC cross member 20 in the vehicle width direction is effectively restrained by the above-described configuration. In other words, the MC cross member 20 is unlikely to be compressively deformed even when a collision load in the vehicle width direction is received from the front side member 12 during a small overlap collision or an oblique collision. As a result, a collision load can be transmitted to the front side member 12 on the opposite side in a more reliable manner. Although the upper member 36 and the lower member 38 are illustrated in a simple shape in FIG. 5 with neither a bead nor a recessed portion illustrated, the upper member 36 and the lower member 38 may be provided with a plurality of beads and a plurality of recessed portions. By the beads and the recessed portions being appropriately disposed, the strength of the MC cross member 20 can be further improved.

From another viewpoint, the MC cross member 20 can be broadly divided into a front side cross portion 20F extending in the vehicle width direction, a rear side cross portion 20R extending in the vehicle width direction behind the front side cross portion 20F, and a pair of side portions 20S connecting both right and left ends of the front side cross portion 20F and both right and left ends of the rear side cross portion 20R to each other. During a small overlap collision or an oblique collision, the side portions 20S function as collision load input and output portions. In other words, a collision load is input to the side portion 20S on one side via the gusset 18 on one side and the front side member 12 on one side. The collision load input from the side portion 20S on one side is transmitted to the side portion 20S on the opposite side via the front side cross portion 20F and the rear side cross portion 20R and output to the front side member 12 on the opposite side from the side portion 20S on the opposite side. Although not particularly limited, it is desirable that the side portions 20S functioning as the load input and output portions as described above are as large as possible in terms of the area of the surfaces thereof that face the front side member 12 (vehicle width direction outside surfaces of the side portions 20S). Although the MC cross member 20 has a substantially quadrangular shape and has the opening portion 34 in the middle thereof, the strength of the MC cross member 20 is enhanced by the front side cross portion 20F and the rear side cross portion 20R being connected to each other by the side portions 20S.

As illustrated in FIG. 5, in the present embodiment, a height direction dimension (thickness) De of the vehicle width direction end portion of the MC cross member 20 is greater than a vehicle height direction dimension Dc of the middle of the MC cross member 20 in the vehicle width direction. For the above-described dimension to be realized, lower end sides 60 of the front and rear end surfaces of the MC cross member 20 have an upwardly convex arch shape. As a result, the vehicle width direction outside surface of the side portion 20S becomes large and the bent front side member 12 is capable of coming into contact with the side portion 20S in a more reliable manner. The height direction dimension (thickness) De of the vehicle width direction end portion may also be formed to be greater on the front side than on the rear side in the vehicle front-rear direction. De may also be formed to be greater than the height direction dimension of the front side member.

In the present embodiment, two projecting walls 62 are disposed on the outside surface of the side portion 20S. The projecting wall 62 is a part that projects outwards in the vehicle width direction beyond the vehicle width direction outside surface of MC cross member 20 at a front side of the projecting wall 62. The projecting wall 62 can be formed by a step and a recessed portion recessed inwards in the vehicle width direction being disposed in the side portion 20S. During a small overlap collision or an oblique collision, the above-described projecting wall 62 hooks the bent front side member 12 and regulates a rearward movement of the front side member 12.

In other words, during a small overlap collision or an oblique collision, a movement of the front side member 12 toward the rear of the vehicle occurs in addition to bending of the front side member 12. When the front side member 12 freely moves rearwards, a collision load is unlikely to be transmitted to the MC cross member 20. When the side portion 20S is provided with the projecting wall 62 projecting outwards in the vehicle width direction, in contrast, the bent front side member 12 abuts against the projecting wall 62, and thus a rearward movement of the front side member 12 beyond the projecting wall 62 is regulated. As a result, the collision load during a small overlap collision or an oblique collision can be transmitted to the MC cross member 20 in a more reliable manner.

Here, the front side member 12 is likely to be bent at the rear end of the gusset 18 or slightly behind the rear end during a small overlap collision or an oblique collision. Although not particularly limited, it is desirable that the vehicle front-rear direction position of the projecting wall 62 is the same as a place where the bending is likely to occur (rear end of the gusset 18 or slightly behind the rear end) or slightly behind the place where the bending is likely to occur. By the projecting wall 62 being disposed at the above-described position, the bent front side member 12 can be hooked in a more reliable manner.

Still, the bending position of the front side member 12 appropriately varies with the direction and the magnitude of an input collision load. During a small overlap collision and during an oblique collision, for example, the bending position of the front side member 12 slightly changes. Although not particularly limited, it is desirable in this regard that one side portion 20S is provided with at least two projecting walls 62 such that the front side member 12 may have a varying bending position.

Although not particularly limited, it is desirable that the front side member 12 is bent inwards in the vehicle width direction during a small overlap collision or an oblique collision. When the front side member 12 and the MC cross member 20 are in contact with each other with no gap in the vehicle width direction, however, bending of the front side member 12 is hindered by the MC cross member 20. In this regard, in the present embodiment, the MC cross member 20 and the front side member 12 are apart from each other in the vehicle width direction at the vehicle front-rear direction position that is the same as a place where bending of the front side member 12 is anticipated. As a result, a space for bending deformation of the front side member 12 can be ensured and the front side member 12 can be bent in a more reliable manner. The place where the bending is anticipated, which will be described later, is the stress concentration portion of the MC cross member 20 and is the rear end of the gusset 18 or an interrupted place 42 (refer to FIG. 7) of a reinforcing rib 40.

Figure 7:
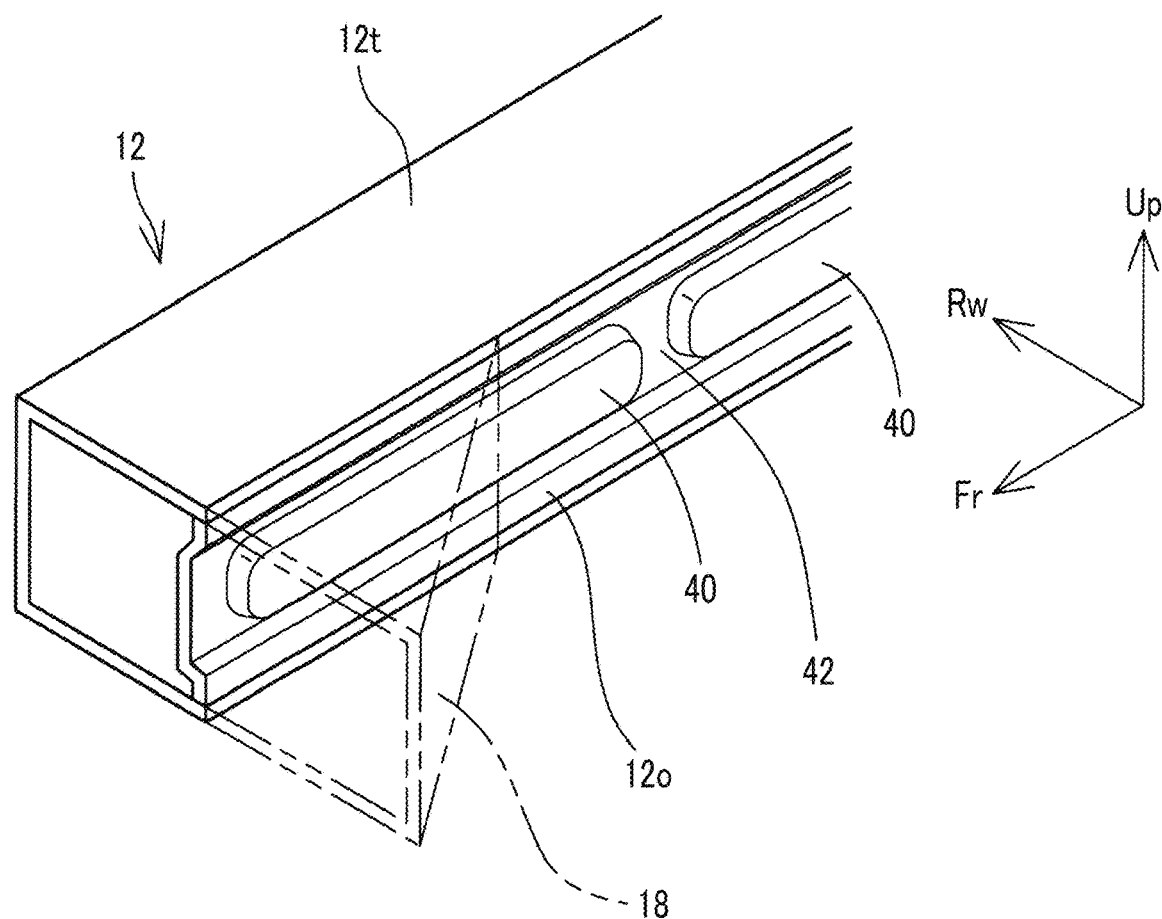
FIG. 7 is a perspective view of the front end of a front side member and the vicinity thereof.

The front side member 12 and the gusset 18 will be described with reference to FIG. 7. FIG. 7 is a perspective view of the front end of the front side member 12 and the vicinity thereof. The front side member 12 is a skeleton member extending in the vehicle front-rear direction and is a hollow square pipe-shaped member. Several stress concentration portions prone to bending and stress concentration are set in the front side member 12. One of the stress concentration portions is the vicinity of the rear end of the gusset 18. In the vicinity of the rear end of the gusset 18, a load input via the gusset 18 is likely to concentrate. The front side member 12 is likely to be bent inwards in the vehicle width direction in the vicinity of the rear end of the gusset 18. Although a vehicle width direction outside surface 12o of the front side member 12 is provided with the reinforcing rib 40, the interrupted place 42 of the reinforcing rib 40 also functions as a stress concentration portion. In other words, the reinforcing rib 40 is disposed for the strength of the front side member 12 to be improved and is a linear bead elongated in the vehicle front-rear direction. Still, the reinforcing rib 40 is interrupted in the middle without being continuous in the vehicle front-rear direction. The front side member 12 is unlikely to be bent in the place where the reinforcing rib 40 is formed. The strength of the interrupted place 42 of the reinforcing rib 40 is locally reduced, and the interrupted place 42 of the reinforcing rib 40 is prone to stress concentration. Accordingly, the interrupted place 42 of the reinforcing rib 40 is a stress concentration portion prone to stress concentration and bending of the front side member 12.

In the present embodiment, the interrupted place 42 of the reinforcing rib 40 is disposed behind the rear end of the gusset 18. Accordingly, depending on the form of stress input, the front side member 12 may be bent in the interrupted place 42 of the reinforcing rib 40 (behind the rear end of the gusset 18). For the front side member 12 to be reliably bendable even in this case, the front side member 12 and the MC cross member 20 are apart from each other in the vehicle width direction at the vehicle front-rear direction position that is the same as the interrupted place 42 of the reinforcing rib 40. At least one of the projecting walls 62 described above is disposed at the vehicle front-rear direction position that is the same as the interrupted place 42 of the reinforcing rib 40 or behind the interrupted place 42 of the reinforcing rib 40. As indicated by the two-dot chain lines in FIG. 7, the gusset 18 is attached to the outside surface 12o of the front side member 12. The related art can be appropriately used in the configuration of the gusset 18, and thus detailed description thereof will be omitted here.

Figure 8:
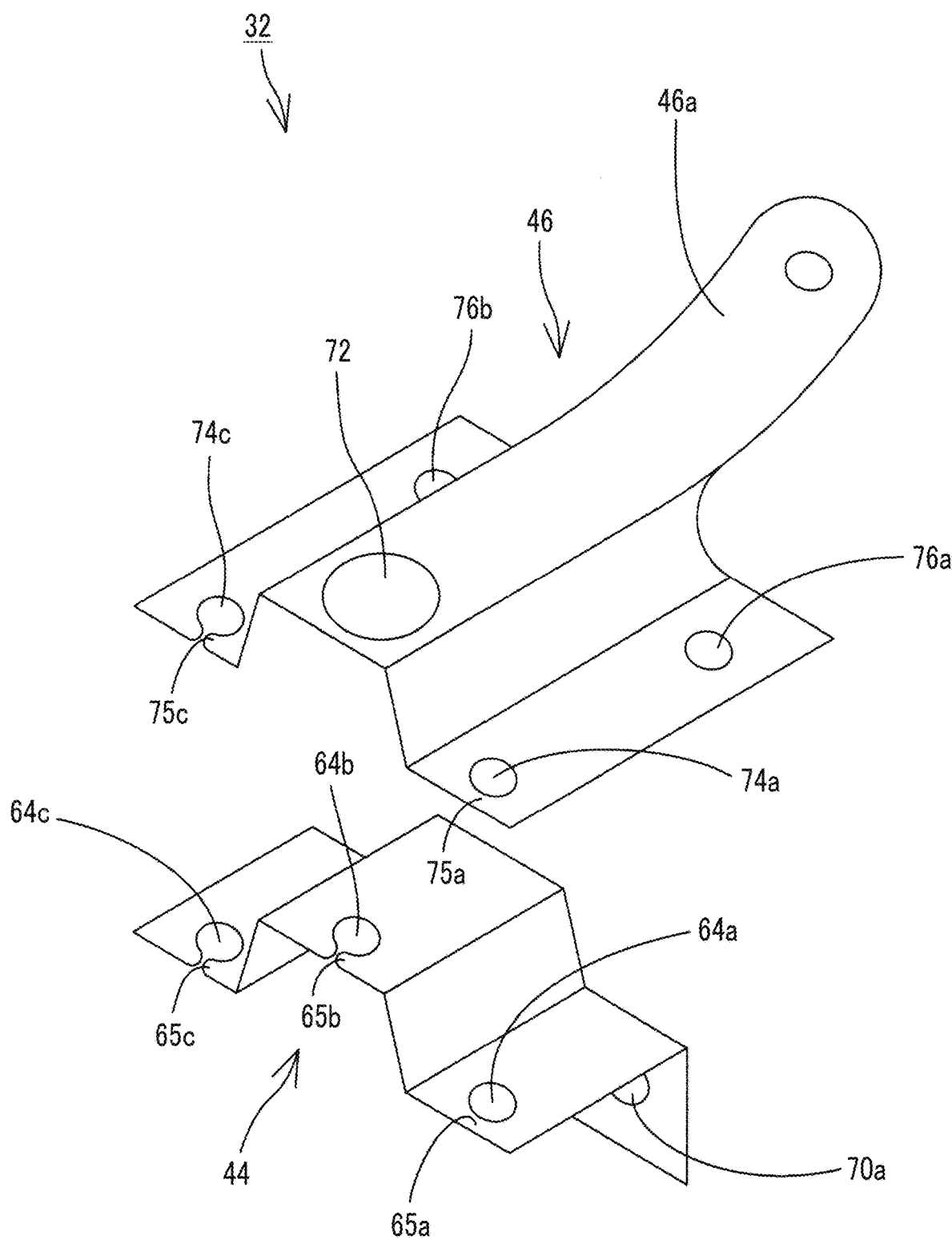
FIG. 8 is an exploded perspective view of a bracket.
Figure 9:
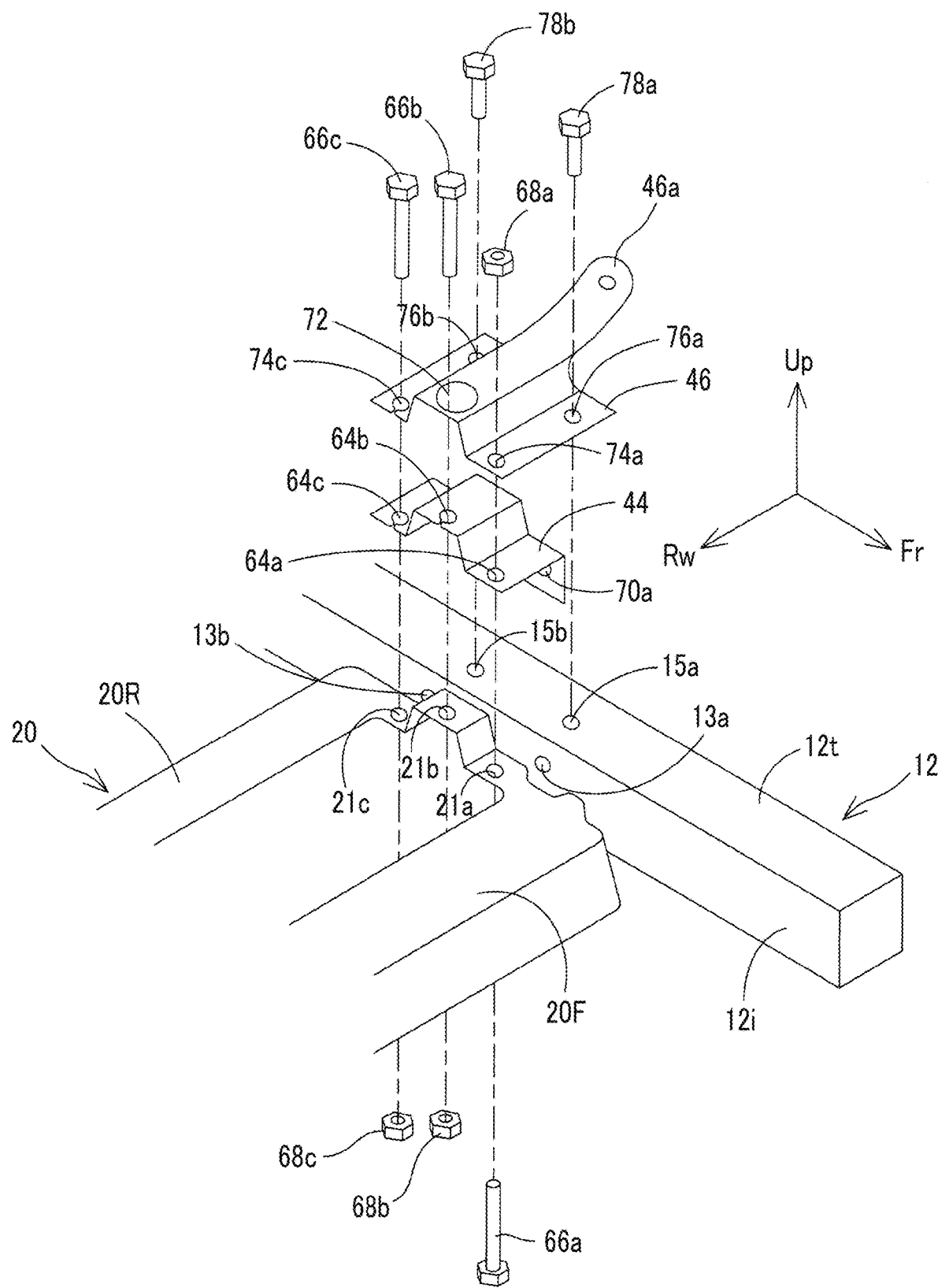
FIG. 9 is a perspective view illustrating how the bracket is attached.

The front side member 12 and the MC cross member 20 are connected to each other via the bracket 32. FIG. 8 is an exploded perspective view of the bracket 32. FIG. 9 is a perspective view illustrating how the bracket 32 is attached. The bracket 32 has two bracket pieces 44, 46. The two bracket pieces 44, 46 constitute the bracket 32 by overlapping each other in the up-down direction. As illustrated in FIGS. 1 and 3, the bracket 32 is attached behind the stress concentration portion where bending of the front side member 12 is anticipated (the rear end of the gusset 18 or the interrupted place 42 of the reinforcing rib 40) in the vehicle. The bracket 32 connects the front side member 12 and the MC cross member 20 to each other in a state where the front side member 12 and the MC cross member 20 are apart from each other in the vehicle width direction.

The first bracket piece 44 connects the upper surface of the MC cross member 20 and a vehicle width direction inside surface 12i of the front side member 12. Accordingly, the first bracket piece 44 has a substantially L-shape that has a surface extending in a substantially horizontal direction to be along the upper surface of the MC cross member 20 and a surface extending in a substantially vertical direction to be along the inside surface 12i of the front side member 12. Three first fastening holes 64a to 64c are formed side by side in the front-rear direction in the horizontal surfaces of the first bracket piece 44. The first fastening holes 64a to 64c are holes into which first fastening bolts 66a to 66c are inserted and are formed at positions corresponding to fastening holes 21a to 21c formed in the MC cross member 20. Two second fastening holes 70a (one of the two second fastening holes 70a not being illustrated in FIGS. 8 and 9) are formed side by side in the front-rear direction in the vertical surface of the first bracket piece 44. The second fastening holes 70a are holes into which second fastening bolts (not illustrated) are inserted and are formed at positions corresponding to fastening holes 13a, 13b formed in the inside surface of the front side member 12.

The second bracket piece 46 connects the upper surface of the MC cross member 20 and an upper surface 12t of the front side member 12. Accordingly, the second bracket piece 46 has a surface extending in a substantially horizontal direction to be along the upper surface of the MC cross member 20 and the upper surface 12t of the front side member 12. The second bracket piece 46 also has an extending portion 46a greatly extending outwards such that the second bracket piece 46 can be fastened to another member (such as a suspension tower).

One insertion hole 72 and two first fastening holes 74a, 74c are formed in the vicinity of the vehicle width direction inside end portion of the second bracket piece 46. The two first fastening holes 74a, 74c are arranged on both sides of the insertion hole 72 in the front-rear direction. The positions of the first fastening holes 74a, 74c and the insertion hole 72 are almost the same as the positions of the first fastening holes 64a to 64c of the first bracket piece 44. Still, the insertion hole 72 is larger in diameter than the head portions of the first fastening bolts 66a to 66c.

Two third fastening holes 76a, 76b are formed side by side in the front-rear direction in the vicinity of the vehicle width direction outside end portion of the second bracket piece 46. The third fastening holes 76a, 76b are formed at positions corresponding to fastening holes 15a, 15b formed in the upper surface 12t of the front side member 12.

During connection between the MC cross member 20 and the front side member 12, the first bracket piece 44 is screwed and fastened to the inside surface 12i of the front side member 12 first. Then, the second bracket piece 46 is placed on the first bracket piece 44 and the second bracket piece 46 is screwed and fastened to the upper surface 12t of the front side member 12. Subsequently, the MC cross member 20 is lifted up with the rotary electric machine unit 22, the PCU 24, and the charger 26 assembled, and the upper surface of the MC cross member 20 is disposed on the lower side of the bracket 32. In this state, the first bracket piece 44 and the second bracket piece 46 are screwed and fastened to the MC cross member 20 by means of the first fastening bolts 66a to 66c and nuts 68a to 68c.

Figure 10:
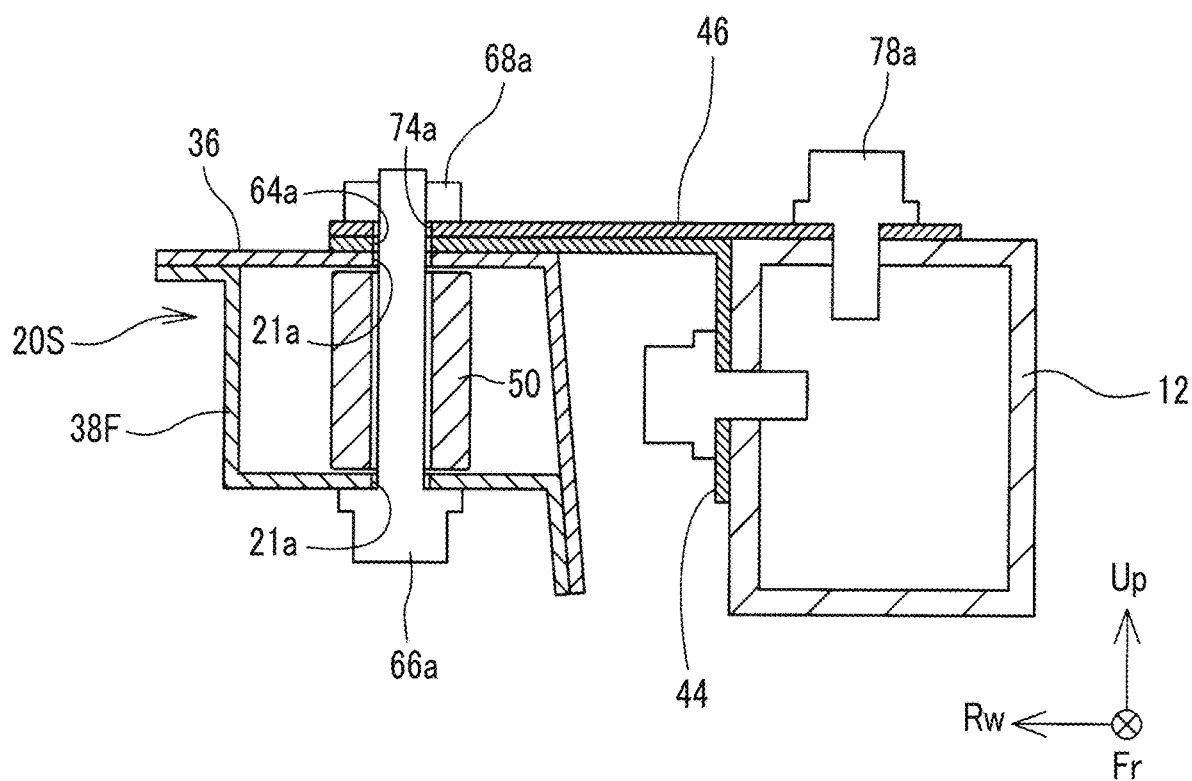
FIG. 10 is a schematic end view along a cutting line through a first fastening bolt.

Here, the fastening holes 21a, 21c on the front and rear sides as two of the three fastening holes 21a to 21c formed in the MC cross member 20 are formed in both the upper member 36 and the lower member 38. The first fastening bolts 66a, 66c inserted into the fastening holes 21a, 21c penetrate the closed section of the MC cross member 20. This will be described with reference to FIG. 10. FIG. 10 is a schematic end view along a cutting line passing through the first fastening bolt 66a.

As illustrated in FIG. 10, a collar 50 extending in a thickness direction is disposed in the MC cross member 20 (in the closed section). The collar 50 is arranged on the same axis as the fastening hole 21a formed in the upper member 36 and the lower member 38, and the height of the collar 50 is almost equal to or slightly less than the height of the closed section. During fastening of the MC cross member 20, the first bracket piece 44, and the second bracket piece 46, the first fastening bolt 66a is inserted into the fastening hole 21a of the lower member 38, the collar 50, the fastening hole 21a of the upper member 36, the first fastening hole 64a of the first bracket piece 44, and the first fastening hole 74a of the second bracket piece 46. Then, the nut 68a is tightened after being screwed to the male screw that protrudes from the upper surface of the second bracket piece 46. In other words, the attachment rigidity of the first fastening bolts 66a, 66c can be improved by the first fastening bolts 66a, 66c penetrating the closed section of the MC cross member 20 as described above with the lower member 38, the collar 50, the upper member 36, the first bracket piece 44, and the second bracket piece 46 between the first fastening bolt 66a and the nut 68a. In this case, the torsional rigidity of the MC cross member 20 is improved, and thus deflection and deformation of the MC cross member 20 can be effectively restrained even when the MC cross member 20 vibrates by receiving vibration from the transaxle and a high-voltage part.

Here, the gap portions between the first fastening holes 64a to 64c and the inside end side of the first bracket piece 44 in the vehicle width direction and the gap portions between the first fastening holes 74a, 74c and the inside end side of the second bracket piece 46 in the vehicle width direction are load-bearing portions 65a to 65c, 75a, 75c (refer to FIG. 8) receiving a load from the first fastening bolts 66a to 66c when the first bracket piece 44 and the second bracket piece 46 are pulled outwards in the vehicle width direction. In the present embodiment, the strength of the load-bearing portions 65a, 75a, which have the foremost position among a plurality of the load-bearing portions 65a to 65c, 75a, 75c, is higher than the strength of the other load-bearing portions 65b, 65c, 75c. Specifically, as is apparent from FIG. 8, the first fastening holes 64a, 64c on the middle and rear sides as two of the three first fastening holes 64a to 64c formed in the first bracket piece 44 have a substantially C-shape with a vehicle width direction inside peripheral edge interrupted in the middle. Likewise, the first fastening hole 74c on the rear side as one of the two first fastening holes 74a, 74c formed in the second bracket piece 46 has a substantially C-shape with a vehicle width direction inside peripheral edge interrupted in the middle. Accordingly, the strength of the load-bearing portions 65b, 65c, 75c on the middle and rear sides is significantly lower than the strength of the load-bearing portions 65a, 75a on the front side. By the above-described configuration being adopted, a rotational movement of the first bracket piece 44 and the second bracket piece 46 is allowed in a case where the front side member 12 is bent.

In other words, as described above and as illustrated in FIG. 3, the front side member 12 is bent inwards in the vehicle width direction at a position in front of the bracket 32 during a small overlap collision or an oblique collision. For the bracket 32 to follow the bending of the front side member 12, the rear end of the bracket 32 needs to rotate around a vertical axis to be displaced outwards in the vehicle width direction as illustrated in FIG. 3. At this time, the bracket 32 is incapable of rotating when the vicinity of the first fastening hole 64b in the middle of the bracket 32 and the vicinity of the first fastening holes 64c, 74c on the rear side are firmly connected to the MC cross member 20. In this regard, in the present embodiment, the peripheral edge of the first fastening hole 64b in the middle and the peripheral edge of the first fastening holes 64c, 74c on the rear side have a substantially C-shape interrupted on the inside in the vehicle width direction. As a result, once a force is applied to the bracket 32 to pull the bracket 32 outwards in the vehicle width direction, the load-bearing portions 65b, 65c, 75c on the middle and rear sides are easily broken and the first fastening bolts 66b, 66c escape from the first fastening holes 64b, 64c, 74c on the middle and rear sides. As a result, the bracket 32 is capable of rotating around the first fastening holes 64b, 74a on the front side with ease.

In the present embodiment, the peripheral edge of the first fastening holes 64b, 64c, 74c as some of the first fastening holes has a substantially C-shape for a strength difference between the load-bearing portions 65a to 65c, 75a, 75c. However, other forms may also be adopted insofar as the load-bearing portions 65a, 75a on the foremost side are higher in strength than the other load-bearing portions 65b, 65c, 75c. For example, a cut, a groove, or the like that extends in the vehicle width direction may be formed in the load-bearing portions 65b, 65c, 75c on the middle and rear sides. Also, the width of the load-bearing portions 65b, 65c, 75c on the middle and rear sides may be less than the width of the load-bearing portions 65a, 75a on the front side.

Figure 11:
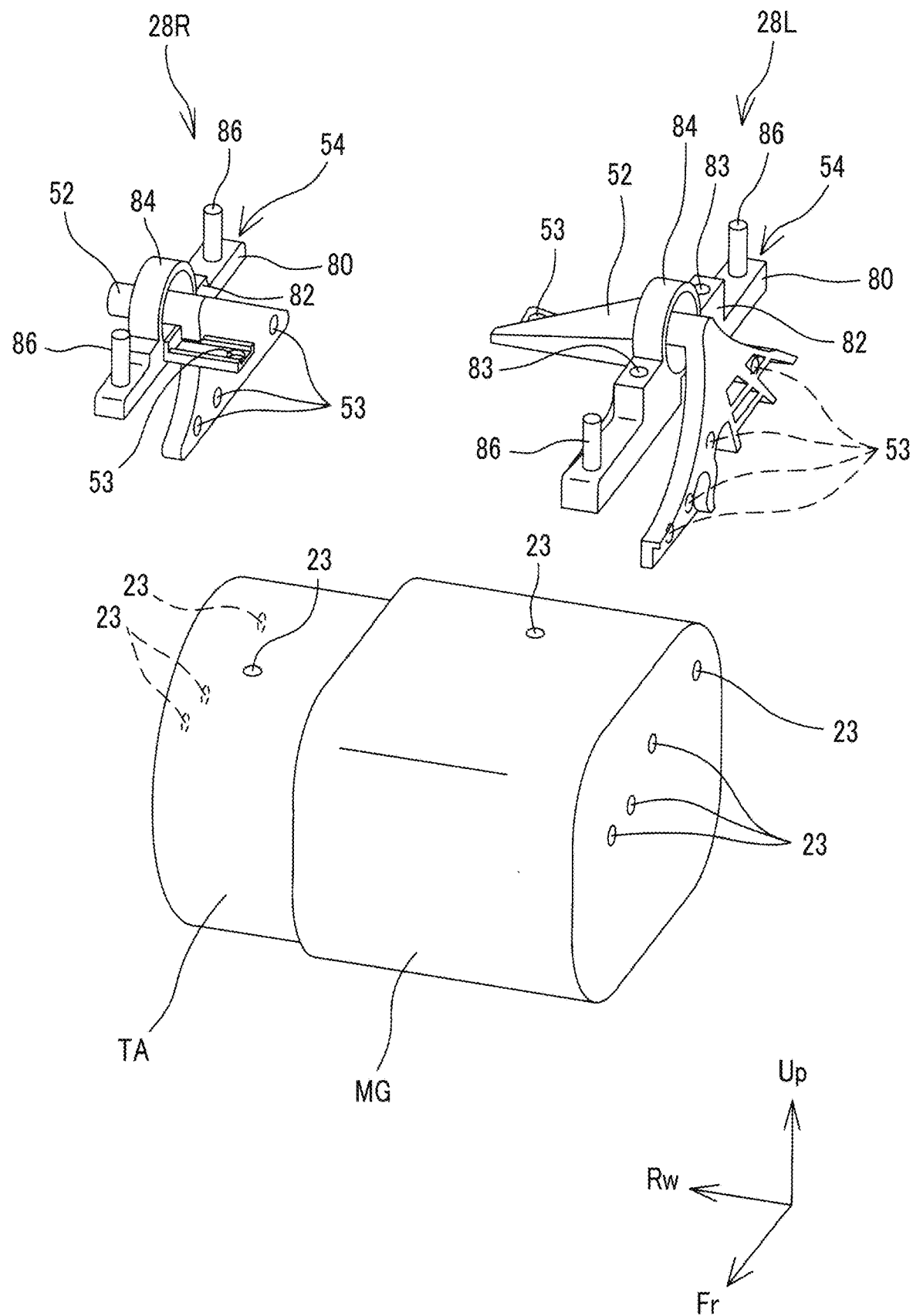
FIG. 11 is a perspective view of a rotary electric machine unit and a motor mount.

The rotary electric machine unit 22 and the motor mount 28 will be described below. FIG. 11 is a perspective view of the rotary electric machine unit 22 and the motor mount 28. As described above, the rotary electric machine unit 22 is provided with the rotary electric machine MG as a vehicle drive source. The fastening openings 23 for fastening with the motor mount 28 are formed at both ends of the rotary electric machine unit 22 in the width direction and in the upper surface of the rotary electric machine unit 22. The rotary electric machine unit 22 is connected to the MC cross member 20 via the right side motor mount 28R and the left side motor mount 28L.

The motor mount 28 is broadly divided into the MG side fastening portion 52 fastened to the rotary electric machine unit 22 and the member side fastening portion 54 fastened to the MC cross member 20. A fastening hole 53 for fastening with the rotary electric machine unit 22 is formed in the MG side fastening portion 52.

The member side fastening portion 54 crosses the opening portion 34 of the MC cross member 20 in the vehicle front-rear direction and is fastened to the bottom surface of the MC cross member 20. The member side fastening portion 54 can be broadly divided into a base portion 80 fastened to the bottom surface of the MC cross member 20, a protruding portion 82 protruding upwards from the middle of the base portion 80, and an arc portion 84 protruding further upwards from the middle of the protruding portion 82.

The vehicle front-rear direction dimension of the base portion 80 is greater than the distance from the rear end of the front side cross portion 20F of the MC cross member 20 to the front end of the rear side cross portion 20R, and the base portion 80 is fastened to the bottom surface of the front side cross portion 20F and the bottom surface of the rear side cross portion 20R. A stud bolt 86 used for the fastening protrudes from the upper surface of the base portion 80. The vehicle front-rear direction dimension of the protruding portion 82 is less than the distance from the rear end of the front side cross portion 20F to the rear end of the rear side cross portion 20R and greater than the front-rear direction dimension of the opening portion 34. The left side motor mount 28L is fastened to the peripheral edge of the opening portion 34 via a fastening hole 83 formed in the protruding portion 82. The arc portion forms a space allowing insertion of the MG side fastening portion 52.

FIG. 12 is a schematic sectional view illustrating the member side fastening portion 54 of the left side motor mount 28L that is fastened to the MC cross member 20. As is apparent from FIG. 12, the base portion 80 is fastened to the MC cross member 20 across the opening portion 34 of the MC cross member 20 in the front-rear direction. By the above-described structure being provided, the motor mount 28 functions as a reinforcing member for the MC cross member 20. In other words, during a full overlap crash, a rearward collision load may be applied to the front end of the MC cross member 20. By receiving the collision load, the front side cross portion 20F deforms the opening portion 34 in a direction of collapse. Although the member side fastening portion 54 connected to the front side cross portion 20F and the rear side cross portion 20R needs to be compressively deformed in the vehicle front-rear direction for the front side cross portion 20F to be deformed toward the rear of the vehicle, compression in the vehicle front-rear direction is unlikely to occur from the shape of the member side fastening portion 54. Accordingly, in the present embodiment, deformation of the MC cross member 20 during a full overlap crash is effectively suppressed. The torsional rigidity of the MC cross member 20 is improved when the member side fastening portion 54 is fastened to the MC cross member 20 to cross the opening portion 34. As a result, vibration of the MC cross member 20 during a normal operation and noise generation attributable thereto are suppressed.

As is apparent from FIG. 12, the protruding portion 82 of the member side fastening portion 54 is arranged between the front side cross portion 20F and the rear side cross portion 20R disposed apart from each other in the front-rear direction. Accordingly, when the front side cross portion 20F is deformed rearwards during a full overlap crash, the front side cross portion 20F abuts against the protruding portion 82. As a result of this abutting, a further rearward movement of the front side cross portion 20F is regulated and deformation of the front side cross portion 20F is hindered. In other words, by the protruding portion 82 of the member side fastening portion 54 being arranged between the front side cross portion 20F and the rear side cross portion 20R, deformation of the MC cross member 20 (especially deformation causing the opening portion 34 to be smashed) is more effectively restrained.

As is apparent from FIG. 12, the stud bolt 86 fastening the base portion 80 and the front and rear side cross portions 20F, 20R penetrates the closed sections of the front and rear side cross portions 20F, 20R as is the case with the first fastening bolts 66a, 66c fastened to the bracket 32. In other words, a collar 90 is disposed in the closed sections of the front and rear side cross portions 20F, 20R and the stud bolt 86 and a nut 88 tighten the base portion 80 (motor mount 28), the lower member 38, the collar 90, and the upper member 36 together. As a result, the attachment rigidity of the stud bolt 86 can be improved. The torsional rigidity of the MC cross member 20 is improved, and thus deflection and deformation of the MC cross member 20 can be effectively restrained.

The front end of each of the high-voltage parts such as the rotary electric machine unit 22, the charger 26, and the PCU 24 is attached behind the front end of the MC cross member 20. Accordingly, the collision load during a full overlap crash is applied to the MC cross member 20 before being applied to the rotary electric machine unit 22, the charger 26, and the PCU 24. Although the member side fastening portion 54 extends in a direction parallel to the vehicle front-rear direction according to the above description, the member side fastening portion 54 may also extend in a direction inclined with respect to the vehicle front-rear direction insofar as the member side fastening portion 54 stretches between the front side cross portion 20F and the rear side cross portion 20R.

The behavior of each part during a frontal collision will be described below. The behavior during a full overlap crash in which the vehicle collides with a collision body in almost the entire width thereof will be described first. In the case of a full overlap crash, a collision load is input to almost the entire surface of the bumper RF 14. The collision load is partially absorbed by the crash box 16 being compressively deformed. The collision load that is not absorbed by the crash box 16 is transmitted to the front end of the front side member 12. Although the front side member 12 is supposed to endure the collision load, the front side member 12 is deformed (bent and curved) to escape from the collision load in a case where the collision load is too large for the front side member 12 to handle. During the deformation (bending and curving), the bumper RF 14 moves toward the rear of the vehicle and the collision load may be partially input to the MC cross member 20 from the bumper RF 14 directly or via another member interposed between the bumper RF 14 and the MC cross member 20.

Once the collision load directed toward the rear of the vehicle is applied to the MC cross member 20, the front side cross portion 20F of the MC cross member 20 deforms the opening portion 34 in a direction of collapse. However, the member side fastening portion 54 of the motor mount 28 is connected to the front side cross portion 20F and the rear side cross portion 20R to cross the opening portion 34. The member side fastening portion 54 functions as a reinforcing member regulating deformation of the MC cross member 20 in the front-rear direction. By the member side fastening portion 54 being connected to the front side cross portion 20F and the rear side cross portion 20R, the relative displacement of the two cross portions 20F, 20R is regulated and deformation of the MC cross member 20 is suppressed.

Even if connection between the front side cross portion 20F and the member side fastening portion 54 is released due to, for example, damage to a fastening bolt 92 and the stud bolt 86 connecting the front side cross portion 20F and the member side fastening portion 54, the protruding portion 82 of the member side fastening portion 54 is still interposed between the front side cross portion 20F and the rear side cross portion 20R. Accordingly, a further rearward movement of the front side cross portion 20F is regulated by the front side cross portion 20F abutting against the protruding portion 82 even if the front side cross portion 20F moves rearwards. As a result, deformation of the MC cross member 20 is suppressed.

By deformation of the MC cross member 20 being suppressed, insertion of the high-voltage cable through the opening portion 34 is effectively restrained. In addition, the high-voltage parts such as the rotary electric machine unit 22, the PCU 24, and the charger 26 mounted on the MC cross member 20 are more appropriately protected. In addition, the high-voltage parts may be protectable from a collision load by the PCU, a water heater, and the like being disposed in the opening portion 34 of the MC cross member.

The behavior during a small overlap collision or an oblique collision will be described below. In this case, a collision load is applied to the gusset 18 protruding outwards beyond the front side member 12. The collision load applied to the gusset 18 is transmitted to the side surface of the front side member 12 via the gusset 18. At this time, stress attributable to the collision load is likely to concentrate at the rear end of the gusset 18 or in the interrupted place 42 of the reinforcing rib 40. As a result, the front side member 12 is bent inwards in the vehicle width direction in the vicinity of the interrupted place 42 of the reinforcing rib 40 or the rear end of the gusset 18. At this time, the MC cross member 20 and the front side member 12 face each other in a state where the MC cross member 20 and the front side member 12 are apart from each other in the vehicle width direction at the vehicle front-rear direction position that is the same as the stress concentration portion (the rear end of the gusset 18 and the interrupted place 42 of the reinforcing rib 40). In other words, a space for inward bending of the front side member 12 in the vehicle width direction is sufficiently ensured between the MC cross member 20 and the front side member 12. Accordingly, in the present embodiment, the front side member 12 can be reliably bent inwards in the vehicle width direction.

Once the front side member 12 is bent, the fastening position of the front side member 12 and the bracket 32 also changes as illustrated in FIG. 3. As a result of the change in fastening position, the peripheral edge of the first fastening holes 64b, 64c, 74c in the middle and on the rear side is broken and apart from the fastening bolt. As a result, the bracket 32 is capable of rotating around the first fastening holes 64a, 74a on the foremost side to follow the displacement of the fastening position of the front side member 12. As a result, the front side member 12 can be bent in a more reliable manner.

By the front side member being bent inwards in the vehicle width direction, the side surface of the MC cross member 20 is pressed inwards in the vehicle width direction in the bent portion of the front side member 12. At this time, the front side member 12 moves toward the rear of the vehicle as well as inwards in the vehicle width direction. However, the bent portion of the front side member 12 is caught by the projecting wall 62 disposed on the side surface of the MC cross member 20, and thus the rearward movement of the front side member 12 is effectively regulated. As a result, a collision load is transmitted from the front side member 12 to the MC cross member 20 in a more reliable manner.

A collision load input to the side portion 20S of the MC cross member 20 on one side is transmitted to the side portion 20S on the opposite side via the front side cross portion 20F and the rear side cross portion 20R. The side portion 20S on the opposite side abuts and is pressed against the front side member 12 on the opposite side. As a result, the collision load is transmitted to the front side member 12 on the opposite side. The front side member 12 on the opposite side partially absorbs the collision load and is displaced in the vehicle width direction to avoid the collision load. In other words, the entire vehicle body is displaced in the vehicle width direction to escape from the collision load. As a result, occupants and the high-voltage parts can be effectively protected.

As is apparent from the above description, in the vehicle front portion structure 10 according to the present disclosure, the MC cross member 20 and the front side member 12 face each other in a state where the MC cross member 20 and the front side member 12 are apart from each other in the vehicle width direction at the vehicle front-rear direction position that is the same as the stress concentration portion or the rear end of the gusset 18. As a result, the front side member 12 can be bent inwards in the vehicle width direction during a small overlap collision or an oblique collision. As a result, a collision load can be transmitted to the front side member 12 on the opposite side via the MC cross member 20. The configuration that has been described above is an example and the rest of the configuration may be appropriately modified insofar as the MC cross member 20 and the front side member 12 are apart from each other in the vehicle width direction at the vehicle front-rear direction position that is the same as the stress concentration portion or the rear end of the gusset 18. For example, the MC cross member 20 may also have a shape without the opening portion 34 although the MC cross member 20 according to the above-described example has a substantially quadrangular shape and has the opening portion 34 in the middle thereof. Accordingly, the MC cross member 20 may also have a substantially rectangular block shape in plan view. In addition, the MC cross member 20 may have a shape in which two stretching portions stretching in a substantially X-shape are provided, between the front side cross portion 20F and the rear side cross portion 20R, in place of the side portions 20S. The fastening positions (the fastening holes 13a, 13b and the fastening holes 15a, 15b) of the brackets 44, 46 may also be formed at the same position as a motor mount fastening position of an engine vehicle. In other words, a part of the vehicle front portion structure such as the front side member 12 may be shared with a vehicle in which an engine is disposed as a power unit.

What is claimed is:
1. A vehicle front portion structure comprising:
a pair of front side members arranged at a distance from each other in a vehicle width direction, each of the front side members extending in a vehicle front-rear direction;
a gusset attached to a vehicle width direction outside surface of each of the front side members, protruding outwards in the vehicle width direction beyond the front side member, and having a vehicle width direction dimension decreasing toward a rear of the vehicle; and an MC cross member stretching between the front side members,
wherein the MC cross member and the front side members face each other in a state where the MC cross member and the front side members are apart from each other in the vehicle width direction at the same vehicle front-rear direction position as a rear end of the gusset.

2. The vehicle front portion structure according to claim 1, wherein:
a projecting wall is disposed on a vehicle width direction outside surface of the MC cross member at the same vehicle front-rear direction position as the rear end of the gusset or a vehicle front-rear direction position behind the rear end of the gusset; and
the projecting wall projects outwards in the vehicle width direction beyond the vehicle width direction outside surface of the MC cross member at a front side of the projecting wall.

3. The vehicle front portion structure according to claim 2, wherein:
a reinforcing rib extending in the vehicle front-rear direction and interrupted in a middle is disposed in a vehicle width direction end surface of the front side member; and
the projecting wall is disposed at the same vehicle front-rear direction position as the interrupted place of the reinforcing rib or a vehicle front-rear direction position behind the interrupted place of the reinforcing rib.

4. The vehicle front portion structure according to claim 1, wherein:
the MC cross member includes an upper member forming an upper surface of the MC cross member and lower members forming a bottom surface of the MC cross member; and
the upper member and the lower members form closed sections by being connected to each other.

5. The vehicle front portion structure according to claim 4, further comprising a bracket connecting the MC cross member and the front side members to each other in a state where the MC cross member and the front side members are apart from each other in the vehicle width direction, wherein:
the bracket, the upper member, and the lower members are tightened together by first fastening bolts and nuts; and
the first fastening bolts penetrate the closed sections the upper member and the lower members constitute.

6. The vehicle front portion structure according to claim 4, wherein:
the MC cross member includes
a front side cross portion extending in the vehicle width direction, and
a rear side cross portion disposed behind the front side cross portion and extending in the vehicle width direction;
the vehicle front portion structure further comprises motor mounts connecting a high-voltage part to the MC cross member and stretching between the front side cross portion and the rear side cross portion;
the motor mounts, the upper member, and the lower members are tightened together by a stud bolt and a nut; and
the stud bolt penetrates the closed sections the upper member and the lower members constitute.

7. The vehicle front portion structure according to claim 1, further comprising a bracket connecting the MC cross member and the front side members to each other in a state where the MC cross member and the front side member are apart from each other in the vehicle width direction.

8. The vehicle front portion structure according to claim 7, wherein:
the bracket is fastened to the MC cross members and the front side member at the same vehicle front-rear direction position behind the rear end of the gusset;
the bracket has a plurality of first fastening holes used for fastening with the MC cross member and arranged side by side in the vehicle front-rear direction;
load-bearing portions as predetermined gaps are interposed between a vehicle width direction inside end portion of the bracket and the first fastening holes, respectively; and
the load-bearing portions having a foremost position are higher in strength than the other load-bearing portions.

9. The vehicle front portion structure according to claim 1, wherein a vehicle width direction end portion of the MC cross member is greater in height direction dimension than a vehicle width direction middle of the MC cross member.

10. The vehicle front portion structure according to claim 1, wherein the MC cross member includes
a front side cross portion extending in the vehicle width direction,
a rear side cross portion disposed behind the front side cross portion and extending in the vehicle width direction, and
a pair of side portions connecting end portions of the front side cross portion and the rear side cross portion to each other.

11. The vehicle front portion structure according to claim 1, wherein:
the MC cross member includes
a front side cross portion extending in the vehicle width direction; and
a rear side cross portion disposed behind the front side cross portion and extending in the vehicle width direction; and
the vehicle front portion structure further comprises motor mounts connecting a high-voltage part to the MC cross member and stretching between the front side cross portion and the rear side cross portion.

12. The vehicle front portion structure according to claim 11, wherein:
the motor mounts include
a base portion fastened to bottom surfaces or upper surfaces of the front side cross portion and the rear side cross portion, and
a protruding portion protruding in a vehicle height direction from a middle of the base portion; and
the protruding portion is positioned in a gap between the front side cross portion and the rear side cross portion when the base portion is fastened to the front side cross portion and the rear side cross portion.

13. A vehicle front portion structure comprising:
a pair of front side members arranged at a distance from each other in a vehicle width direction, each of the front side members extending in a vehicle front-rear direction; and
an MC cross member stretching between the front side members, wherein:
the front side members has a stress concentration portion where stress concentration occurs during a small overlap collision or an oblique collision; and
the MC cross member and the front side members face each other in a state where the MC cross member and the front side member are apart from each other in the vehicle width direction at the same vehicle front-rear direction position as the stress concentration portion.

* * * * *